United States Patent [19]

Chester

[11] Patent Number: 5,634,725
[45] Date of Patent: Jun. 3, 1997

[54] BEARING ASSEMBLY

[76] Inventor: Keith I. Chester, 10 Leland Place, Kirkhill, Morpeth, Northumberland NE61 2AN, England

[21] Appl. No.: 646,371
[22] PCT Filed: Jan. 10, 1995
[86] PCT No.: PCT/GB95/00037
  § 371 Date: May 9, 1996
  § 102(e) Date: May 9, 1996
[87] PCT Pub. No.: WO95/18924
  PCT Pub. Date: Jul. 13, 1995

[30] Foreign Application Priority Data

Jan. 11, 1994 [GB] United Kingdom ............ 9400392

[51] Int. Cl.$^6$ ............................................. F16C 17/10
[52] U.S. Cl. ..................... 384/117; 384/122; 384/306; 384/309
[58] Field of Search ........................... 384/117, 122, 384/306–312

[56] References Cited

U.S. PATENT DOCUMENTS

| | | | |
|---|---|---|---|
| 4,059,318 | 11/1977 | Hollingsworth | 384/117 |
| 4,643,592 | 2/1987 | Lewis et al. | 384/311 |
| 4,738,550 | 4/1988 | Gardner | 384/306 |
| 4,743,125 | 5/1988 | Dammel et al. | 384/117 |

*Primary Examiner*—Lenard A. Footland
*Attorney, Agent, or Firm*—Rodman & Rodman

[57] ABSTRACT

A bearing assembly for supporting a rotatable shaft comprises a number of bearing pads supported in a housing and the mutually engaging surfaces of each bearing pad and the housing are two surfaces of closely similar shape.

9 Claims, 4 Drawing Sheets

BEARING ASSEMBLY

The present invention is concerned with bearing assemblies of both the journal and thrust bearing types and is an improved bearing assembly.

Bearing assemblies are used in a very wide range of applications to afford radial and/or axial support for rotating shafts or spindles. While unitary journals or thrust rings are widely used, there are considerable advantages in constructing a bearing assembly from several discrete pads, which individually abut the shaft or thrust collar and are able to rock about a pivot to provide a wedge-shaped clearance between each pad and the rotating member. The introduction of oil into the bearing assembly by suitable means allows the development of a hydrodynamic film of oil between the bearing element and the rotating shaft or collar. This working film of oil prevents direct contact between the shaft or collar and the surface of the bearing element, which may be coated with an anti-friction material such as white metal.

The majority of prior bearing pad assemblies have depended upon line contact between the pad and the adjacent housing and the pads have typically been designed to rock by some 5 to 10 degrees of arc about the line of contact. This considerable freedom to rock allows adequate freedom for adjustment of the pad position and makes only moderate demands on the accuracy required of the relevant components.

FIG. 1 of the accompanying drawings illustrates, in sectional view transverse to the axis of the rotating shaft, three conventional forms of bearing pad mounting. In FIG. 1a, a journal pad 10 is shown supported on an integral bar or ridge pivot 10a. The pad 11 shown in FIG. 1b is supported upon a bar pivot 12 formed as an insert of hardened metal incorporated in the pad. Pads of this latter type are a feature of the journal bearing described in U.S. Pat. No. 3,022,123.

FIG. 1c illustrates a journal pad 13 with a curved back. The difference in curvature between the back of the pad and the adjacent housing allows some 5 to 10 degrees of rocking about the line of contact between these components, which line moves to a relatively small extent around the curved surface of the housing as the bearing pad rocks. Pads of this type are described in U.S. Pat. No. 3,711,169.

During rotation of a shaft supported by a bearing assembly of the foregoing types, the formation of the oil film in the wedge between bearing pad and shaft is accompanied by the rocking of the pad. A stable condition is reached where the position of the shaft and the loads upon it are in balance with the forces produced by the various oil film pressures on the bearing elements.

The only constraint on the position of the shaft arises from the oil pressure generated within the clearance between the shaft and the operating surfaces of the bearing elements. The shaft may be subject to variations in its load, which in turn results in changes in the thickness of the oil films and in the pressure profiles and the position of the shaft. Although these changes are usually small, they can result in changes in the pad position by rocking about its line of pivoted contact with the surface of the housing. In the case of some prior bearing assemblies, this movement of the pad can adversely affect bearing performance, where instability can result. Factors such as the risk of such instability may unduly influence the machine designer's choice of bearing type, for example between plain sleeve bearings and journal pad bearings.

Bearings operating at high rotational speeds, which are most likely to suffer instability problems, also tend to be fairly lightly loaded, which light loading contributes to the tendency of the shaft to orbit within the available bearing space. Bearings likely to suffer such problems are usually specifically designed to overcome the potential problems because there is no alternative solution generally available. Attempts to counter the problem by controlling the external damping or modifying the machine performance rarely succeed.

Against the foregoing background, it is an object of the present invention to provide an improved bearing assembly, whereby the ability of the bearing pads to rock quickly about their lines of contact with the housing is restricted and the risk of potential instability may be reduced to levels which are acceptable.

The improved bearing assembly according to the present invention, for supporting a rotatable shaft, comprises a plurality of bearing pads supported by a surrounding housing, the mutually engaging surfaces of each bearing pad and the housing being two surfaces of closely similar shape, which surfaces diverge in a first direction generally circumferential to the shaft and are each either rectilinear or only very slightly curved in a second direction generally at right angles to the first direction, the differences between the surfaces in said respective directions being such that the contact angle between the surfaces is less than three degrees of arc in said first direction and less than one degree of arc in said second direction.

The close matching of the surface of the bearing pad to that of the adjacent housing enables a thin wedge of oil to be trapped between these components. This wedge of oil effectively damps quick rocking of the bearing pad about its line of contact with the housing, by means of the considerable resistance generated by the oil under squeeze film conditions. However, normal rocking of the bearing pad at low speeds is not restricted so there is no material effect on the normal formation of a hydrodynamic oil wedge.

The same benefits and considerations apply also to thrust pad bearing assemblies as apply to journal pad bearing assemblies.

The contact angle between the interengaging surfaces of the bearing pad and the housing is preferably less than one degree of arc in the circumferential direction of the shaft and less than 0.2 degree of arc, more preferably less than 0.1 degree, in the second direction. Preferably the ratio of these two angles in these respective directions is at least 5:1 and more preferably at least 10:1. As a result of these very small angles of contact, under elastic loading conditions the area of contact is in the form of an ellipse with a high aspect ratio, typically of the order of 10:1.

In one form of the present invention, the two surfaces are both rectilinear in the second direction (which is parallel to the axis of the shaft in the case of a journal bearing and radial to that axis in the case of a thrust bearing). That is, they are two generally cylindrical surfaces. The difference between the radii of curvature of such generally cylindrical surfaces should be small, and preferably is less than one per cent. More preferably, the difference is less than 0.1 per cent. The maximum angular rocking movement of the pad may as a result be as little as one degree of arc and typically about 0.25 degrees.

The pads may advantageously be held in position within the housing by locating pins, for example projecting from the housing into sockets in the pads. The extent to which the pins project should be such that the pads are prevented from movement around the shaft but are not supported or restrained by the pins.

The invention will now be further described with reference to the accompanying drawings, which illustrate, by way of example only, four embodiments of the bearing assembly according to the present invention and wherein:

BRIEF DESCRIPTION OF THE DRAWINGS

FIG. 2a is a transverse sectional view of the first journal bearing assembly and FIG. 2b is a corresponding sectional view in a plane parallel to the axis of the shaft. The bearing is assembled from four bearing pads 20, only one of which is shown, each secured in a housing 21 by a pin 22 which prevents the pad from being displaced relative to the housing but does not support the pad. The outer surface of the bearing pad 20, of which the radius is shown by the reference letter A, and the inner surface of the housing (radius B), are both of cylindrical form. Radius A is approximately 0.05 per cent less than radius B. The line of contact of the two cylindrical surfaces is a straight line parallel to the axis of the shaft, about which line the pad 20 may rock by a very small amount.

FIG. 3a is a plan view, in the direction of the axis of the shaft, of the first thrust bearing assembly and FIGS. 3b and 3c are sectional views of individual bearing pads 30 in the directions of the arrows B—B and C—C respectively. The bearing assembly comprises eight thrust pads 30, supported by a housing 31 and retained therein by pins 32; the pins prevent the pads from being displaced relative to the housing but do not support them. The curvature of the pad 30 has been exaggerated in FIG. 3b for the sake of clarity (that is, the radius of curvature of the pad is shown reduced) but in practice the radius is so large that the angle between the engaging surfaces at the line of contact is less than one degree of arc and typically about 0.25 degrees.

The second illustrated embodiment of a journal bearing assembly is shown in transverse sectional view in FIG. 4a and in a sectional view in a plane parallel to the axis of the shaft, in the direction of the arrows A—A, in FIG. 4b. As illustrated in FIG. 4a, the outer surface of each bearing pad 40 is of slightly smaller diameter (of the order of 0.1 per cent less) than the inner surface of the housing 41. In an axial direction, the inner surface of the housing is rectilinear and the outer surface of the pad 40 is very slightly convex, such that the surfaces diverge by an angle of about 0.1 degree of arc in that direction. These differences of curvature are exaggerated in the drawings in the interests of visual clarity.

Figure 1A:
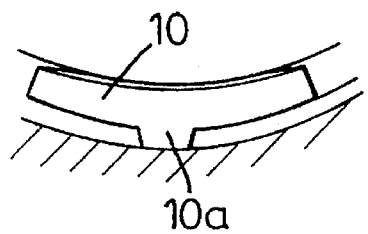
FIGS. 1a, 1b, and 1c illustrate three conventional forms of bearing pad mounting.
Figure 1B:
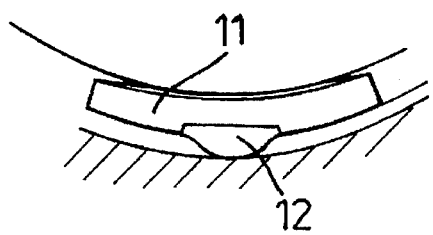
Figure 1C:
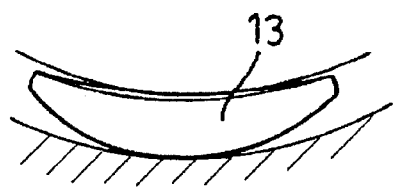
Figure 2A:
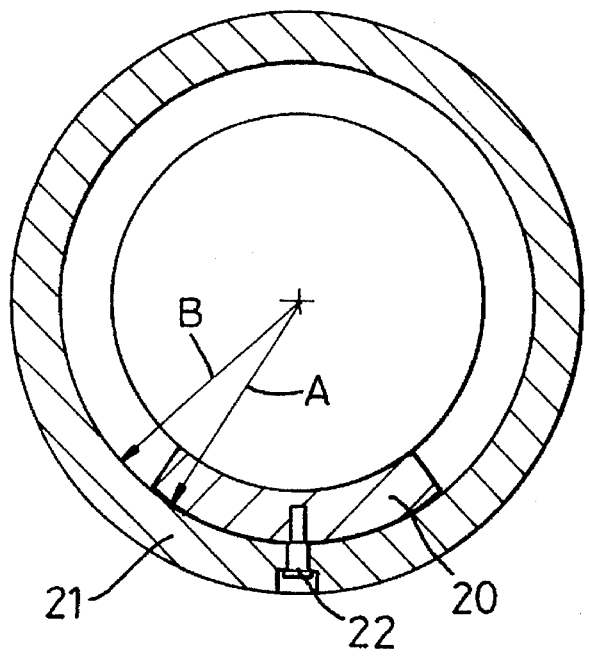
FIGS. 2a and 2b show a first embodiment of journal bearing assembly.
Figure 2B:
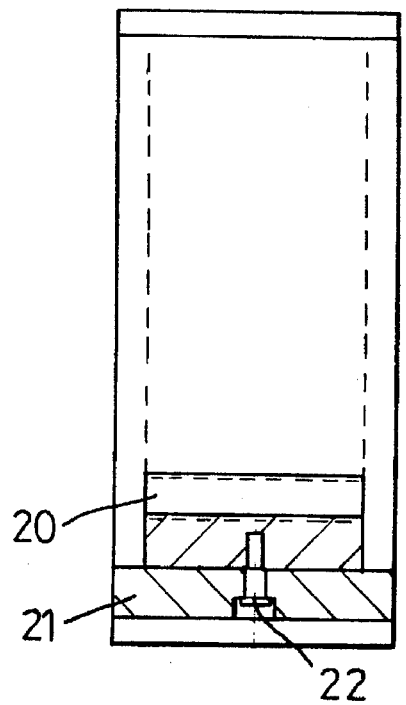
Figure 3A:
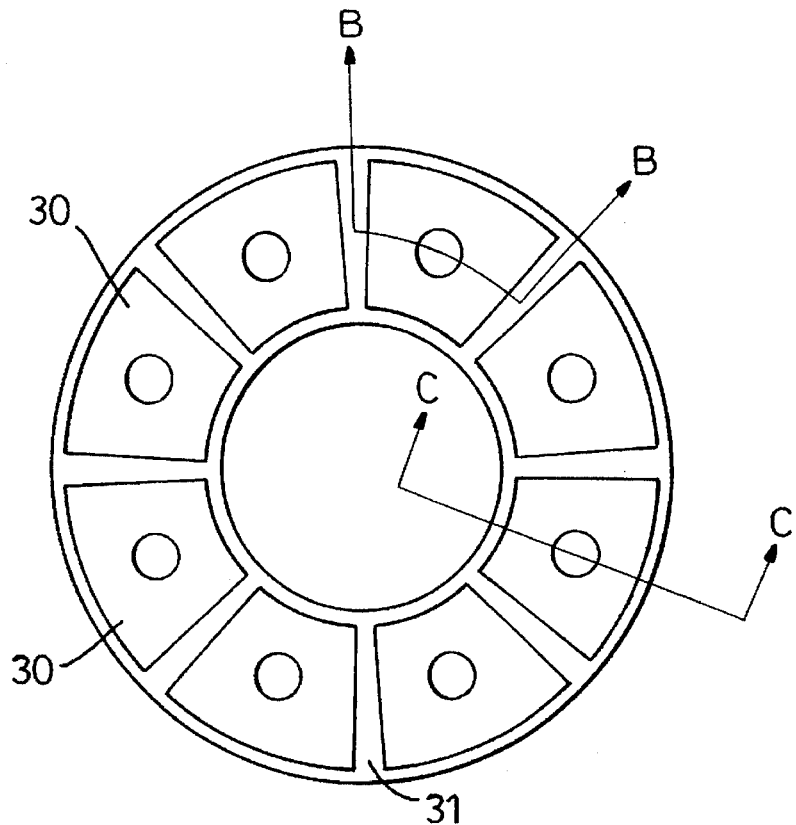
FIGS. 3a, 3b and 3c show a first embodiment of thrust bearing assembly.
Figure 3B:
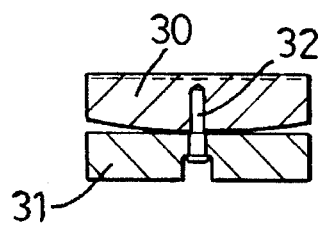
Figure 3C:
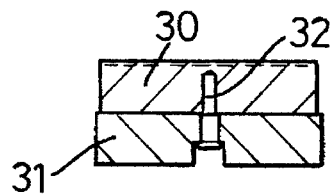
Figure 4A:
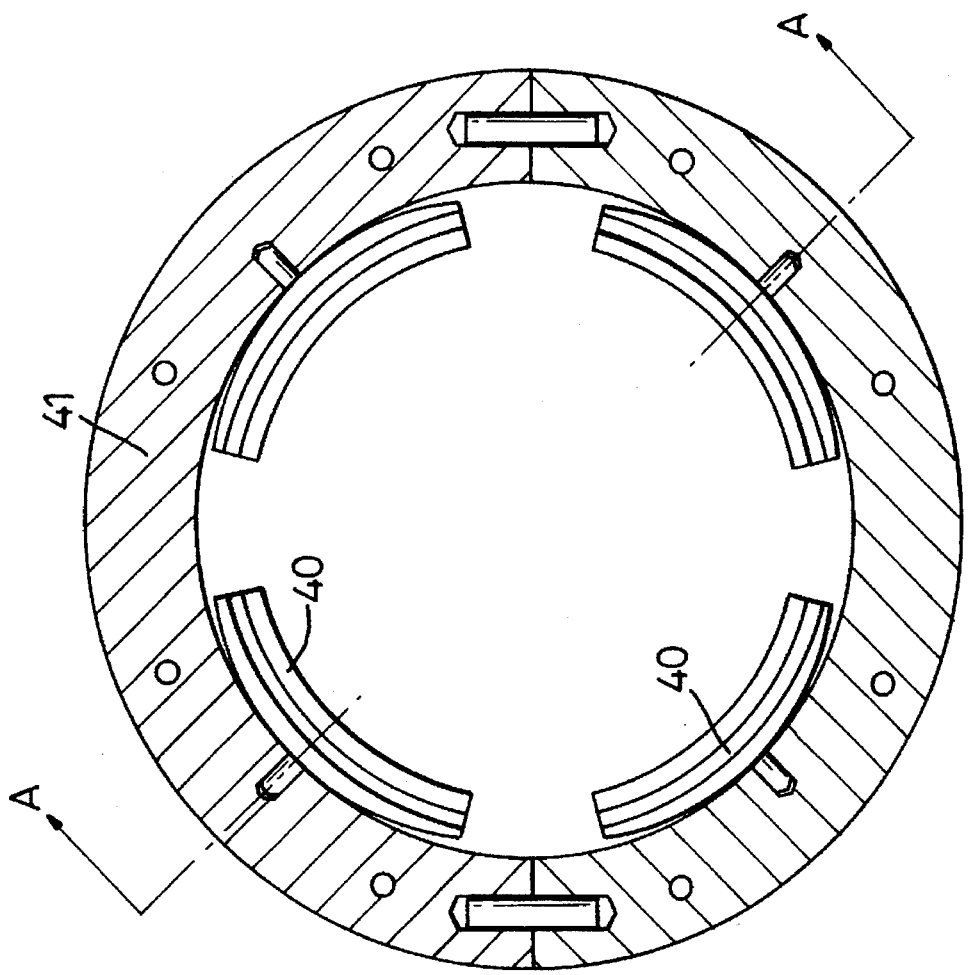
FIGS. 4a and 4b show a second embodiment of journal bearing assembly.
Figure 4B:
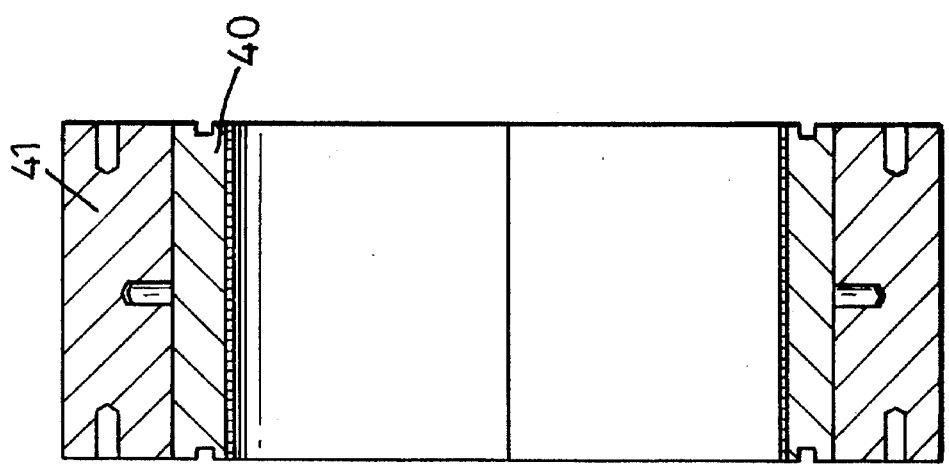
Figure 5A:
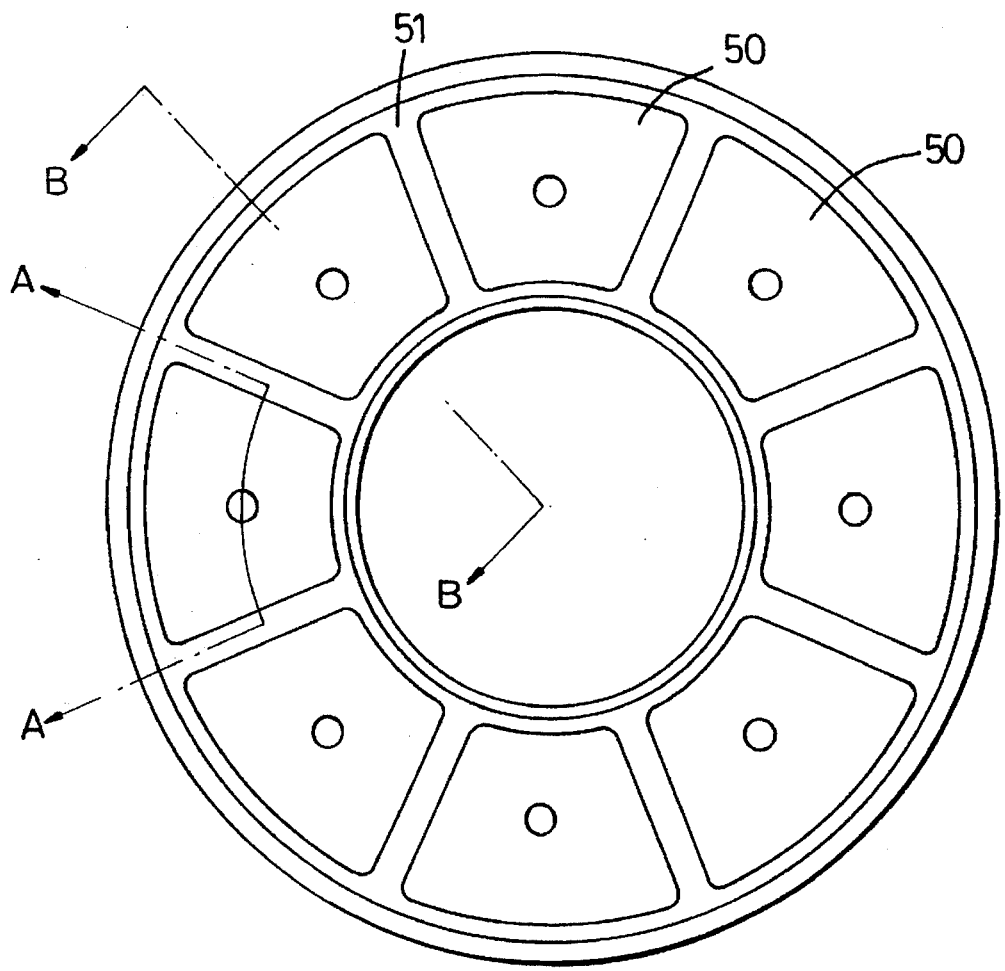
FIGS. 5a, 5b and 5c show a second embodiment of thrust bearing assembly.
Figure 5B:
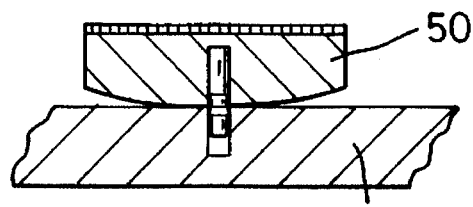
Figure 5C:
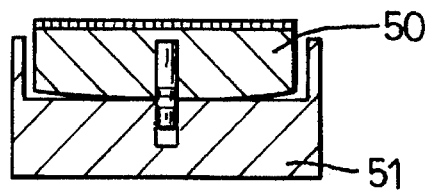

Finally, the second illustrated form of thrust bearing is shown in FIG. 5a in transverse sectional view and in FIGS. 5b and 5c as sectional views in the directions of the arrows A—A and B—B respectively. In the circumferential direction, the difference of curvature between the curved outer surface of the bearing 50 and the flat surface of the housing 51 which it engages (which difference is exaggerated in FIG. 5b) is such as to give a contact angle of about one degree between the surfaces in that direction. In the radial direction, the contact angle (exaggerated in FIG. 5c) is about 0.1 degree of arc.

As will be understood, the bearing assembly according to the present invention, in particular in its illustrated preferred forms, represents a significant improvement over prior available bearing assemblies such as those discussed above. The susceptibility to instability in operation may be reduced to the point where it becomes negligible as a result of the oil squeeze effect attributable to the interengagement of closely similar bearing pad and housing surfaces.

I claim:

1. A bearing assembly for supporting a rotatable shaft, which assembly comprises a plurality of bearing pads supported by a surrounding housing, the mutually engaging surfaces of each bearing pad and the housing being two surfaces of closely similar shape, which surfaces diverge in a first direction generally circumferential to the shaft and are each either rectilinear or only very slightly curved in a second direction generally at right angles to the first direction, the differences between the surfaces in said respective directions being such that the contact angle between the surfaces is less than three degrees of arc in said first direction and less than one degree of arc in said second direction.

2. A bearing assembly according to claim 1, wherein said contact angle is less than one degree of arc in said circumferential direction and less than 0.1 degree of arc in said second direction.

3. A bearing assembly according to claim 1, wherein the ratio of the contact angle in said first direction to that in said second direction is at least 5:1.

4. A bearing assembly according to claim 1, wherein the ratio of the contact angle in said first direction to that in said second direction is at least 10:1.

5. A bearing assembly for a rotatable shaft, comprising a number of bearing pads supported by a housing surrounding said bearing pads, each said bearing pad having a surface which engages a similarly-shaped surface of said housing, which interengaging surfaces of said bearing pads and said housing respectively diverge in a first direction which is generally circumferential with respect to said shaft and which interengaging surfaces are each either rectilinear or slightly curved in a second direction which is generally perpendicular to said first direction, wherein the contact angle between said interengaging surfaces is less than one degree of arc in said first direction and wherein the contact angle between the interengaging surfaces is within the range between zero and 0.1 degree of arc in said second direction.

6. A bearing assembly according to claim 5, wherein said two mutually engaging surfaces are both rectilinear in said second direction.

7. A bearing assembly according to claim 6, wherein the difference in the radii of curvature of said surfaces in said first direction is less than one per cent.

8. A bearing assembly according to claim 7, wherein said difference in the radii of curvature is less than 0.1 per cent.

9. A bearing assembly according to claim 6, wherein said bearing pads are held in position within said housing by pins.

* * * * *